United States Patent [19]

Thomas et al.

[11] 3,924,573

[45] Dec. 9, 1975

[54] ANIMAL FEEDING DEVICE

[75] Inventors: Wil B. Thomas; Fred Boggs, both of Marysville, Ohio

[73] Assignee: Riverby Farms, Inc., Marysville, Ohio

[22] Filed: Jan. 8, 1974

[21] Appl. No.: 431,776

[52] U.S. Cl. .................................................. 119/61
[51] Int. Cl.² ........................................... A01K 5/00
[58] Field of Search .............................. 119/61–63, 119/51 R, 18

[56] References Cited
UNITED STATES PATENTS

| | | | |
|---|---|---|---|
| 1,435,404 | 11/1922 | Lloyd | 119/61 |
| 1,881,065 | 10/1932 | Shirley | 119/61 |
| 3,259,106 | 7/1966 | Ray et al. | 119/51 R |
| 3,324,833 | 6/1967 | Clugston | 119/61 |
| 3,329,321 | 7/1967 | Moore | 119/61 X |

Primary Examiner—J. N. Eskovitz
Attorney, Agent, or Firm—Cushman, Darby & Cushman

[57] ABSTRACT

An animal feeding device comprising an open-topped box-like body having front, rear, bottom and end walls and a plurality of horizontally spaced apart planar partitions which extend between the front and rear walls and divide the interior of the body into a plurality of compartments each having therein a solid animal feed substance, a major portion of the open tops of said compartments lying in an inclined plane extending downwardly and forwardly, the bottom wall in at least one of said compartments having an aperture therethrough, means in said one compartment supporting the solid feed substance therein at an elevation above the bottom wall so as to allow circulation of air around the solid feed substance.

3 Claims, 4 Drawing Figures

ANIMAL FEEDING DEVICE

This invention relates to a holder for supplementary solid diet substances to be made accessible to domestic animals, especially horses in their stalls.

Holders of the general type with which the present invention is concerned comprise one or more open-top compartments in which small salt blocks and/or other solid diet substances are retained so as to be readily available to the animal. Examples of holders known to the applicants are disclosed in U.S. Pat. Nos. 3,200,790, 1,737,797, 842,835, 490,767 and 86,066.

It is the principal object of the present invention to provide an improved holder, adapted to be mounted to an existing wall or other vertical structure, which is simply and economically constructed as an integrally cast metal structure having a plurality of diet-substance compartments and a configuration assuring that air may circulate freely around and into those compartments holding salt blocks or other substances which withdraw water from the atmosphere.

The invention will be further understood from the following detailed description of an exemplary embodiment taken with the drawing in which.

Figure 1:
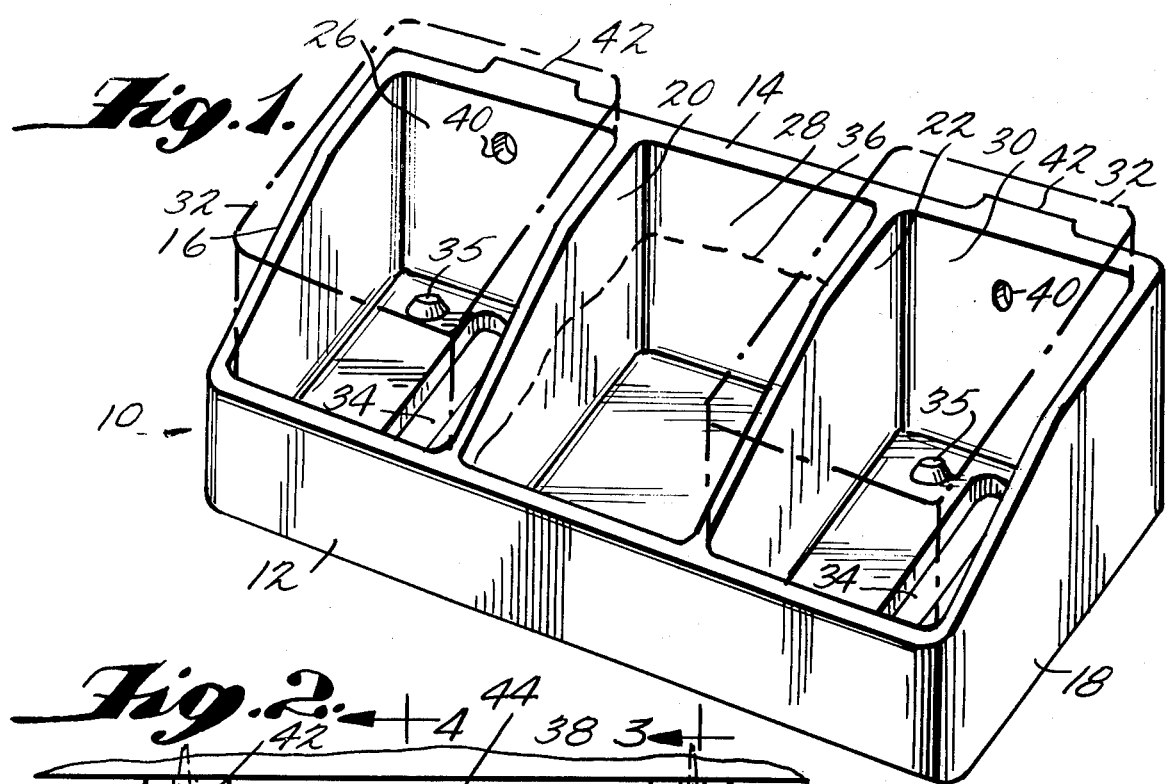
FIG. 1 is a perspective view of a holder constructed in accordance with the principles of the present invention.
Figure 2:
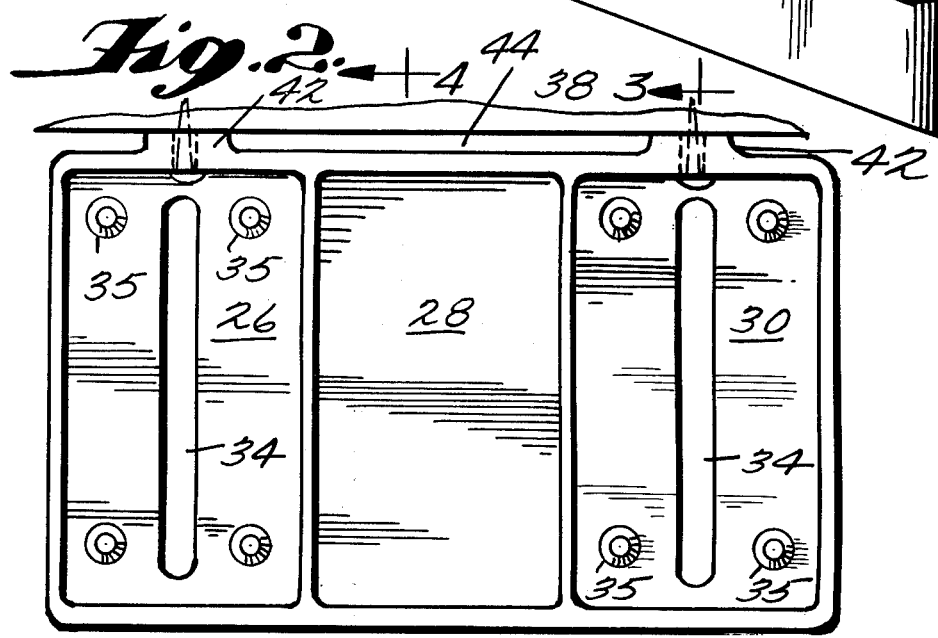
FIG. 2 is a plan view of the holder of FIG. 1.
Figure 3:
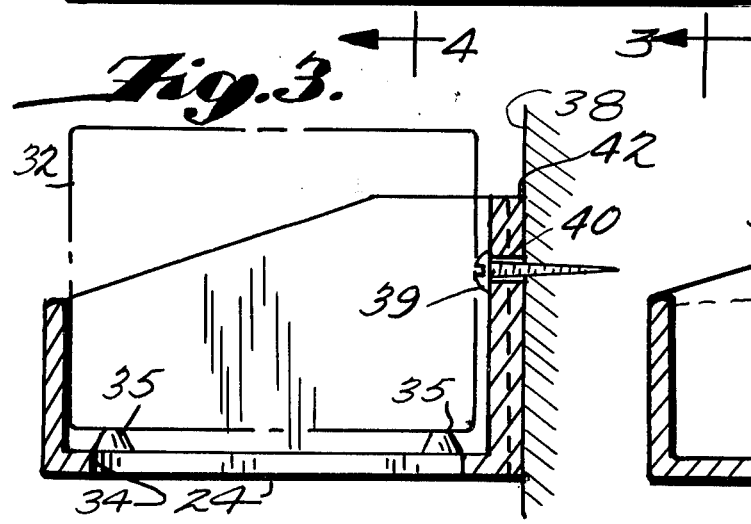
Figure 4:
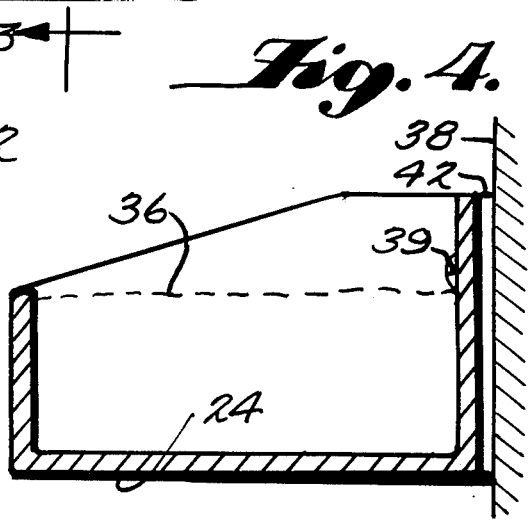

FIGS. 3 and 4 are sectional views taken on the lines 3—3 and 4—4, respectively, in FIG. 2.

The mineral holder 10 in the illustrated embodiment is an open-top box-like structure cast from metal such as aluminum as a single integral piece which includes a vertical rectangular front wall 12, a vertical rectangular rear wall 14 and end walls 16 and 18. Two internal partitions 20 and 22 parallel to the end walls 16, 18 extend between and are integral with the front and real walls 12, 14. A flat bottom wall 24 is integral with the lower edges of the front, rear and side walls and with the lower edges of the partitions 20 and 22. The interior of the holder 10 is thereby divided into three side-by-side compartments 26, 28 and 30 of equal size. The rear wall 14 is of greater vertical dimension than the front wall 12, and a major portion of the upper edges of the end walls 16 and 18 and of the partitions 20 and 22 lie in a common plane which is inclined downwardly from back to front to provide easy access to the compartments by the animal's tongue.

Each end compartment 26 and 30 holds a single solid block of salt 32, one of which will usually include a mineral supplement. The bottom wall 24 at the location of each of these compartments 26 and 30 is provided with an aperture such as a slot 34 which allows circulation of air into the compartment and drainage of any water or animal saliva entering the compartment. The blocks 32 are of slightly less horizontal cross section than the compartments 26 and 30 and are supported slightly above the bottom wall 24 by means of upwardly projecting studs 35 or the like which are formed integrally with the bottom wall 24 during casting of the holder 10. There is therefore free circulation of air around the sides and lower surfaces of the blocks 32.

The center compartment 28 holds a granular diet composition 36 such as a vitamin composition. The bottom wall 24 is therefore imperforate in this compartment.

The holder 10 is adapted to be secured to an existing vertical support such as a wall 38 of the animal's stall, by means of screws 39 or the like which pass through suitable holes 40 in the rear wall 14. In order to provide additional circulation of air to the holder 10, it is desired to provide a space between the rear wall 14 and the supporting wall 38. This is accomplished in the illustrated embodiment by two bosses such as vertical ribs 42 which project rearwardly from the rear wall 14 so as to engage the supporting wall 38.

In use, the holder 10 is mounted on the wall 38 at an elevation convenient to the animal so that the latter may insert its tongue into any of the compartments 26, 28 and 30. Since the open upper end of each compartment faces both upwardly and forwardly as a result of the greater vertical dimension of the rear wall 14, the interior of each compartment is readily accessible. Any liquid which might collect in the end compartments 26 and 30 can drain out through the slots 34 and at the same time air can pass into or out of these compartments through the slots 34 and can pass through the space 44 between the supporting wall 38 and the holder 10.

What is claimed is:

1. An animal feeding device comprising an integrally cast metal body having a vertical rear wall, a vertical front wall extending parallel to and being of substantially less vertical dimension than said rear wall, a horizontal bottom wall connectinig to lower edges of said rear and front walls, vertical parallel end walls joining said rear, front and bottom walls, a plurality of vertical partitions extending between said rear and front walls and dividing the interior of the body into a plurality of open-topped compartments each of which is adapted to receive an animal feed substance, a major portion of the upper edges of said partitions and said end walls being inclined downwardly from the upper edge of said rear wall to the upper edge of said front wall so that the open upper ends of said compartments face both upwardly and forwardly to provide ready access by an animal to a feed substance in each compartment, said bottom wall in at least one of said compartments having an aperture therethrough for aiding circulation of air into and out of said one compartment and said bottom wall in said one compartment having integral, upwardly projecting studs for supporting a solid block of animal feed substance in spaced relationship to said bottom wall, said bottom wall in at least one other compartment being imperforate so as to retain a granular feed substance in said other compartment, said rear wall having at least one aperture therethrough for receiving a fastening means for fastening said body to a vertical support surface, and the exterior surface of said rear wall having at least one horizontally projecting boss which serves to space said body from the vertical support surface when said body is fastened thereto, thereby aiding in the circulation of air behind said body.

2. An animal feeding device comprising an open-topped box-like body having front, rear, bottom and end walls and a plurality of horizontally spaced apart planar partitions which extend between the front and rear walls and divide the interior of the body into a plurality of compartments for holding solid animal feed substances, said rear wall including at least one rearwardly projecting spacer portion which effects an air space between said rear wall and any vertical support surface to which it may be attached, a major portion of the open tops of said compartments lying in an inclined plane extending downwardly and forwardly, the bottom wall in at least one of said compartments having an aperture therethrough, means in said one compartment for supporting a solid feed substance therein at an elevation above the bottom wall so as to allow circulation of air around the solid feed substance, the bottom wall in another of said compartments being impervious.

3. An animal feeding device adapted to be fastened to a vertical supporting surface comprising an open-topped box-like body having a front wall, a vertical rear wall, a bottom, end walls and at least one vertical partition extending between said front wall and said rear wall so as to divide the interior of the body into at least two compartments for holding animal feed substances, said partition and said end walls having upper edges which slope downwardly from the upper edge of the rear wall to the upper edge of the front wall so that said compartments face both upwardly and forwardly to provide ready access by an animal, the bottom of at least one of said compartments having an aperture therethrough, and means in said one compartment for supporting a solid feed substance therein at an elevation above the aperture.

* * * * *